United States Patent Office 3,138,707
Patented June 23, 1964

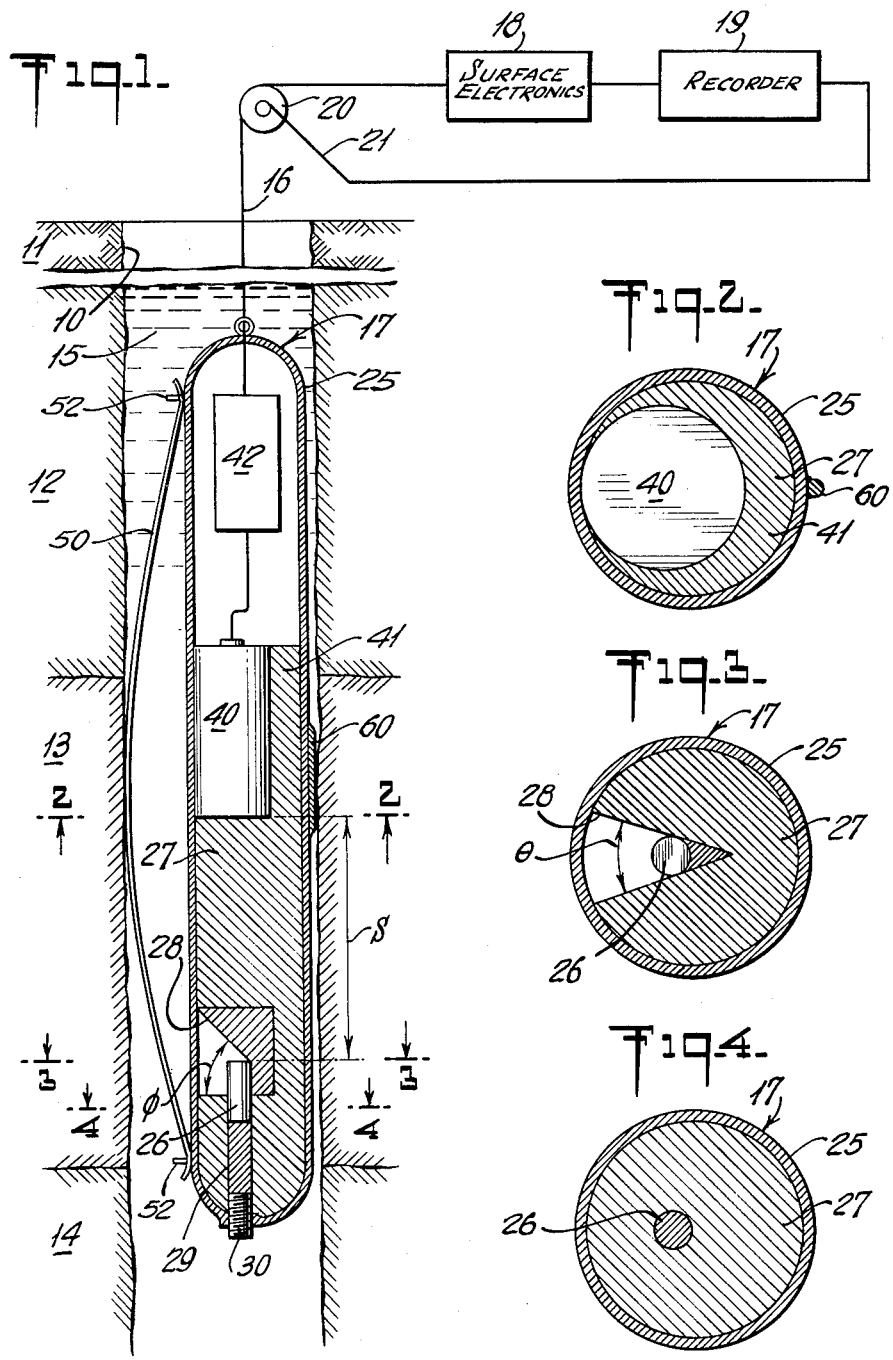

1

3,138,707
RADIATION CALIPER WELL LOGGING
APPARATUS
Hugh E. Hall, Jr., and Ralph C. Reynolds, Houston, Tex., assignors to Texaco Inc., New York, N.Y., a corporation of Delaware
Filed Oct. 14, 1960, Ser. No. 62,692
4 Claims. (Cl. 250—43.5)

The present invention relates generally to radiation well logging, and more particularly it is concerned with the use of penetrative radiation techniques for calipering a borehole traversing a plurality of earth formations.

For various reasons it is often necessary or desirable to have a caliper log of boreholes of the type drilled in the petroleum industry for producing oil. For example, it is often necessary to have such information for correlation purposes along with the usual neutron-gamma radiation well logs employed for determining such information as the porosity of the formations along the borehole. It is also desirable to have a caliper log for correlation with gamma-gamma radiation logs conducted for determining the density of the earth formations.

Conventionally, borehole caliper logs are conducted by means of apparatus employing mechanical probes or feelers in contact with the sides of the borehole for determining variations in the configuration thereof. The caliper information is plotted on a logging record in correlation with the position of the caliper measurement in the borehole.

It has been proposed to conduct borehole caliper measurements simultaneously with neutron-gamma radiation or gamma-gamma radiation well logs. For example, apparatus for carrying out this proposal is disclosed in U.S. Patent 2,761,977, granted September 4, 1956, to Alexander S. McKay. The above-mentioned McKay patent describes the influence of variations in borehole size on both the neutron-gamma and gamma-gamma well logs. The patentee also suggests that the gamma-gamma log, often referred to as a scattered gamma log, can also be used as a caliper measurement of the borehole. However, the patentee does not suggest the use of specific apparatus for such use, other than the usual gamma-gamma radiation formation logging apparatus.

It is a general object of the present invention to provide improvements in penetrative radiation logging instrumentation particularly directed to measurement of the size of the borehole rather than a characteristic of the material of the adjacent earth formations.

It is a more particular object of the present invention to provide apparatus of the character described which is relatively simple to construct and operate.

Briefly stated, a preferred aspect of the present invention involves the provision of apparatus for conducting a penetrative radiation caliper well log of a borehole comprising an instrument housing suitable to be passed through the borehole for measuring the influence of variations in the size of the borehole on the intensity of a beam of penetrative radiation scattered in the borehole. More particularly, the instrument housing includes a source of penetrative radiation and a penetrative radiation detector sensitive to radiation scattered in the borehole from the source. Means are provided for continuously urging one side of the instrument against the side of the borehole along the adjacent earth formations as the instrument is passed therethrough. The source is provided with a shield for preventing gamma radiation from passing directly from the source to the detector. The source shield substantially encloses the source except for a collimated opening for directing gamma radiation from the source primarily away from the adjacent earth formations on the side of the instrument towards which the instrument is continuously urged and through the open borehole so that the radiation scattered from the source to the detector will be influenced primarily by changes in the size of the borehole rather than by variations in the material of which the adjacent formations are comprised. Shielding means are also provided along the side of the detector which is urged against the adjacent earth formation in order to minimize the influence of stray gamma radiation in the borehole along the adjacent earth formation. Means are further provided for indicating a quantitative signal display proportional to the intensity of the radiation detected by the detector in correlation with the position in the borehole where the radiation is detected.

For additional objects and advantages and for a better understanding of the invention, attention is now directed to the following description and accompanying drawings. The features of the invention which are believed to be novel are particularly pointed out in the appended claims.

In the drawings:

FIGURE 1 is a schematic representation showing a vertical elevation through a portion of a borehole traversing a plurality of earth formations and having a well logging instrument suspended therein and which instrument is constructed in accordance with principles of the invention;

FIGURE 2 illustrates a cross-sectional view through the lines 2—2 of the instrument shown in FIGURE 1;

FIGURE 3 illustrates a cross-sectional view through the lines 3—3 of the instrument shown in FIGURE 1; and FIGURE 4 illustrates a cross-sectional view through the lines 4—4 of the instrument shown in FIGURE 1.

Referring now to FIGURE 1 of the drawings there is shown a borehole 10 traversing a plurality of earth formations 11, 12, 13 and 14. The borehole 10 is shown containing a well fluid 15, such as water, crude oil, drilling fluid, or some combination of the foregoing, for example. Suspended within the borehole 10, as by means of a cable 16, there is shown a well logging instrument 17 constructed in accordance with principles of the invention for conducting a caliper log of the formations along the borehole. The cable 16 may include an outer conductive sheath which provides structural support for the instrument 17 and which, together with one or more additional inner insulated conductors (not individually shown) affords means for transmitting electrical power from the surface to the logging instrument and for transmitting electrical signal information between the logging instrument 17 and the surface equipment. The surface equipment provides means for transmitting operating power to the logging instrument (not specifically illustrated) and for receiving the signals transmitted from the logging instrument 17 and amplifying and segregating the received signals as necessary for recording purposes. In particular, the surface equipment includes apparatus designated as surface electronics 18 which may include a suitable amplifying device together with a pulse height equalization network and a ratemeter circuit for providing an output signal which varies as a function of the rate-of-occurrence of the penetrative radiation signal developed by the instrument 17 in the borehole 10 and transmitted to the surface over the cable 16. The output of the surface electronics 18 is shown coupled to a display device shown as a recorder 19 for providing a continuous record of the intensity of detected radiation. In order to correlate the position of the logging instrument 17 in the borehole 10 during the caliper well log there is provided at the surface a measuring apparatus represented diagrammatically as a wheel 20 having an output path 21 coupled to the recorder 19. Thus, the continuous caliper record on the recorder 19 may indicate both the caliper information and position of the logging instrument continuously in correlation.

The logging instrument 17 comprises an elongated outer shell-like housing or casing 25 formed conventionally of steel in accordance with known techniques to withstand the pressures and temperatures commonly encountered in the borehole well logging art. Advantageously, the housing 25 should be of such character as to withstand the conditions that may be found in boreholes of the order of 10,000 or 20,000 feet in depth.

The lower portion of the casing 25 of the instrument 17 is provided with a gamma radiation source 26 positioned within a source chamber defined by a gamma radiation shield 27 which substantially surrounds the source 26 on all sides, except for an opening or collimated slot 28 for directing gamma radiation through the borehole to be calipered while minimizing the passage of gamma radiation into the adjacent earth formations. The shield 27 may advantageously be formed of high density material such as lead or tungsten or one of the improved gamma radiation shielding alloys such as that marketed as "Mallory 1000" metal. The source 26 may be advantageously in the form of a cylinder as shown so that it may be inserted in a cylindrical opening in the shield 27 as illustrated in the drawing and retained therein by means of a plug 29 of gamma radiation shielding materal, which, in turn, is held in place by means of a threaded plug 30 in the lower end of the instrument housing 25. This arrangement permits the source to be readily inserted and removed from the instrument 17 to minimize the radiation health hazard when the instrument is not in use.

Advantageously, as illustrated in the drawings, the source 26 may be offset from the vertical or elongated axis of the logging instrument away from the adjacent earth formations in order to afford maximum shielding between the source and adjacent earth formation from which stray gamma radiation is to be excluded. The collimated aperture 28 in the shield 27 is appropriately shaped for directing radiation towards the open hole side of the logging instrument and generally upwardly toward the gamma radiation detector 40 mounted within the housing above the shield 27.

The gamma radiation detector may be advantageously of the electrical pulse producing type, preferably of the high efficiency multiple cathode type, such as those shown and described in U.S. Letters Patent 2,397,071, D. G. C. Hare. However, it is also contemplated that the invention may be carried out through the use of a scintillation type detector which is sensitive to gamma radiation scattered from the source.

In order to minimize the influence of the adjacent earth formations upon the radiation scattered from the source 26 to the detector 40, a shield 41 is provided behind the detector 40 between the detector and the adjacent earth formation. The output of the detector 40 is coupled to electrical apparatus within the instrument 17 identified as instrument electronics 42 which may include an appropriate power source for the detector together with apparatus for amplifying the output of the detector 40 and transmitting the amplified output over the cable 16 to the surface electronics 18. It is to be understood that the instrument electronics 42 may include such other circuitry as may be necessary for proper operation of the detector 40 including a quench circuit if found desirable for the proper operation of the detector.

In order to urge the instrument 17 continuously against the adjacent earth formation throughout the caliper log there is provided a decentralizing bow spring 50 having its upper and lower ends 51 and 52 mounted to the logging instrument 17 in such manner that the spring 50 is free to flex as the instrument 17 is moved past irregularities in the side of the borehole during the caliper log. This may be accomplished by mounting the upper and lower ends of the bow spring 50 in slidably engageable relationship to the instrument 17, as by means of elongated slots (not shown) in the bow spring 50 which are mounted to studs on the instrument 17.

The side of the instrument 17 which is continuously urged against the adjacent earth formations may be referred to as the inactive side of the instrument 17. This inactive side may be provided with a rib-like member 60 for cutting through mud cake along the side of the instrument in order to assure that the instrument is maintained in generally fixed relation to the side of the borehole against which the instrument is urged throughout a caliper run.

As shown in FIGURE 2, the shield 41 around the rear of the detector 40 may advantageously extend around the sides of the instrument tapering toward the front or active side of the instrument (the left being considered the front as shown in the drawing) so that the shielding around the detector is primarily effective in directions facing the adjacent formation and tapers gradually in directions toward which the formation wall is further away from the detector.

As shown in FIGURE 3, the collimated aperture 28 may advantageously direct gamma radiation in a relatively confined beam which may be of the order of 45° as shown by the angle theta in FIGURE 3.

In accordance with a preferred aspect of the present invention the gamma radiation source should preferably comprise relatively stable source such as radium or cobalt 60.

Preferably in accordance with the present invention, the cathode of the multiple-plate Geiger type radiation detector described above should be formed of higher atomic number material in order to emphasize the detection of gamma radiation scattered from the source. Preferred materials include tungsten and tantalum.

Advantageously in accordance with a preferred aspect of this invention, the distance S between the near end of the source 26 and near end of the detector 40 should be longer than in the case of the usual formation scattered gamma log in order to emphasize the effect of changes in size of the borehole rather than the variations in the material of the earth formations along the borehole. Although the linearity of the measurement of scattered borehole. Although the linearity of the measurement of scattered borehole gamma radiation improves at longer source-to-detector spacings, nevertheless, the overall counting rate decreases at longer spacings. Using a counter having a length of six inches (6 inches) satisfactory caliper logs have been conducted at spacings S of 12 to 20 inches using a radium source of about 200 mg. The preferred range for linearity of response with apparatus thus described is 16 to 20 inches.

In accordance with a further embodiment of the present invention involving the use of a scintillation type detector, rather than the preferred high efficiency multiple-plate Geiger type detector herein described, it is contemplated that the scintillation detector may comprise a thallium activated sodium iodide crystal in combination with an appropriate photomultiplier tube and preamplifier, all of which may be enclosed within a suitable heat insulating chamber such as a Dewar flask and provided with means for temperature stabilization. This may be accomplished through the use of a suitable refrigerant such as ice or by means of refrigeration techniques such as those shown and described in U.S. Letters Patent 2,824,233, granted February 18, 1958, to Gerhard Herzog. In the case of a scintillation type detector, the instrument electronics and surface electronics may be modified to accommodate such a detector and may include an appropriate pulse amplitude or signal discriminator in addition to a noise level discriminator which may be employed regardless of the type detector used. The signal amplitude discriminator, more specifically a pulse height analyzer, in the case of a scintillation type detector may be advantageously adjusted to emphasize the detection of scattered gamma radiation as compared with any natural radiation which may be present in the borehole. The natural gamma radiation has an average energy of the order of 1.1 m.e.v. and may extend up to 2.62 m.e.v.; whereas the scattered gamma radiation will have an energy range depending upon the character of the gamma radiation source used for the caliper log. Using a radium-beryllium source of neutrons of 200 mg. the gamma radiation scattered to the detector would have an average energy of .2 to .3 m.e.v.

It is contemplated within the purview of the present invention that the scattered gamma radiation caliper apparatus herein described and claimed may be combined in the same logging instrument with other logging apparatus of the conventional type, such as a neutron-gamma radiation or gamma-gamma radiation formation logging instrument as described, for example, in the aforementioned patents of Alexander S. McKay and Gerhard Herzog.

Obviously many modifications and variations of the invention, as hereinbefore set forth, may be made without departing from the spirit and scope thereof, and therefore only such limitations should be imposed as are indicated in the appended claims.

We claim:

1. Apparatus for conducting a penetrative radiation caliper well log comprising an instrument housing adapted to be passed through a borehole traversing a plurality of earth formations, said housing containing a source of gamma radiation positioned in said housing, a gamma radiation detector positioned within said housing in the vicinity of said gamma radiation source for detecting gamma radiation scattered in the borehole as the result of irradiation by said gamma radiation source, means including a gamma radiation shield for preventing gamma radiation from passing directly from said source to said detector, said shield substantially enclosing said source except for a collimated opening for directing gamma radiation from said gamma source primarily away from the adjacent earth formations on one side of said instrument and through the material of the borehole in order to minimize the influence of the material of the adjacent earth formations on the gamma radiation reaching said detector from said source, means for shielding said detector from stray gamma radiation in the borehole on said one side of said instrument facing said adjacent earth formations, means for continuously urging said one side of said instrument against the side of the borehole along said adjacent earth formations as the instrument is passed therethrough, and means for providing a signal display quantitatively indicating the intensity of the radiation detected by said detector in correlation with the position in the borehole where said radiation is detected.

2. Apparatus as defined in claim 1 wherein the detector is of the proportional type for providing a signal having an amplitude proportional to the energy of detected radiation and wherein the means for providing the signal display includes a pulse-height analyzer for selectively indicating the intensity of the scattered gamma radiation while minimizing the natural gamma radiation.

3. Apparatus as defined in claim 2 wherein the pulse-height analyzer is designed and adjusted to provide a selective display of scattered gamma radiation below a predetermined threshold energy value to the exclusion of the natural gamma radiation above said threshold energy value.

4. Apparatus as defined in claim 3 wherein said threshold energy value is less than one (1) m.e.v.

References Cited in the file of this patent

UNITED STATES PATENTS

| | | |
|---|---|---|
| 2,469,461 | Russell | May 10, 1949 |
| 2,515,500 | Fearon et al. | July 18, 1950 |
| 2,644,891 | Herzog | July 7, 1953 |
| 2,710,925 | McKay | June 14, 1955 |
| 2,749,446 | Herzog | June 5, 1956 |
| 2,909,661 | Armistead | Oct. 20, 1959 |
| 2,934,652 | Caldwell et al. | Apr. 26, 1960 |
| 2,972,679 | Caldwell et al. | Feb. 21, 1961 |
| 3,038,075 | Youmans | June 5, 1962 |